United States Patent
Natori et al.

(10) Patent No.: US 10,444,735 B2
(45) Date of Patent: Oct. 15, 2019

(54) INFORMATION PROCESSING APPARATUS, CONTROL METHOD, AND STORAGE MEDIUM

(71) Applicant: CANON KABUSHIKI KAISHA, Tokyo (JP)

(72) Inventors: Takuya Natori, Kawasaki (JP); Jiaang Guo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/689,605

(22) Filed: Aug. 29, 2017

(65) Prior Publication Data

US 2018/0059646 A1    Mar. 1, 2018

(30) Foreign Application Priority Data

Aug. 31, 2016 (JP) .................. 2016-169993

(51) Int. Cl.
| | |
|---|---|
| *G05B 19/4099* | (2006.01) |
| *H04L 29/08* | (2006.01) |
| *B33Y 50/00* | (2015.01) |
| *H04L 29/06* | (2006.01) |
| *H04N 1/00* | (2006.01) |

(52) U.S. Cl.
CPC ........ *G05B 19/4099* (2013.01); *H04L 67/125* (2013.01); *H04L 67/34* (2013.01); *B33Y 50/00* (2014.12); *G05B 2219/31352* (2013.01); *G05B 2219/35134* (2013.01); *G05B 2219/49007* (2013.01); *G05B 2219/49013* (2013.01); *G05B 2219/49023* (2013.01); *H04L 67/42* (2013.01); *H04N 1/00827* (2013.01)

(58) Field of Classification Search
CPC ...... G05B 19/4099; G05B 2219/49007; G05B 2219/35134; H04L 67/34; H04L 67/125; H04L 67/42; H04N 1/00827; B33Y 50/00
See application file for complete search history.

(56) References Cited

U.S. PATENT DOCUMENTS

| | | | | |
|---|---|---|---|---|
| 7,403,830 B2 * | 7/2008 | Weber | ............... | A61C 19/04 |
| | | | | 264/138 |
| 8,175,734 B2 * | 5/2012 | Fogel | ............... | G06F 17/50 |
| | | | | 700/119 |
| 8,412,588 B1 * | 4/2013 | Bodell | ............... | G06Q 10/06 |
| | | | | 705/26.5 |
| 9,159,106 B1 * | 10/2015 | Bodell | ............... | G06Q 10/06 |
| 9,208,531 B2 * | 12/2015 | Boerjes | ............... | A61B 5/4547 |

(Continued)

FOREIGN PATENT DOCUMENTS

JP    2015-229349 A    12/2015

*Primary Examiner* — Charles R Kasenge
(74) *Attorney, Agent, or Firm* — Carter, DeLuca & Farrell LLP

(57) ABSTRACT

A client terminal checks whether there is information indicating that forming is impracticable with reference to content of data for a forming apparatus to form a 3-dimensional object and acquires a feature amount and forming setting related to 3-dimensional forming of the data if it is determined that there is no information indicating that the forming is impracticable. The client terminal transmits the acquired feature amount and forming setting to a server and supplies information regarding forming evaluation which is based on the feature amount and the forming setting and is acquired from the server.

11 Claims, 13 Drawing Sheets

(56) References Cited

U.S. PATENT DOCUMENTS

| | | | |
|---|---|---|---|
| 9,327,537 B2 | 5/2016 | Conrow et al. | |
| 9,555,582 B2* | 1/2017 | Javidan | |
| 9,588,726 B2* | 3/2017 | Webb | G06F 3/126 |
| 9,747,394 B2* | 8/2017 | Nelaturi | G06F 17/5009 |
| 9,916,684 B2* | 3/2018 | Goel | G06T 17/00 |
| 9,948,820 B2* | 4/2018 | Webb | G06F 3/126 |
| 10,040,253 B2* | 8/2018 | Jang | B29C 64/386 |
| 10,049,395 B2* | 8/2018 | Bodell | G06Q 10/06 |
| 10,061,870 B2* | 8/2018 | Nelaturi | G06F 17/50 |
| 2009/0298017 A1* | 12/2009 | Boerjes | A61B 5/4547 433/214 |
| 2011/0087350 A1* | 4/2011 | Fogel | G06F 17/50 700/98 |
| 2012/0231421 A1* | 9/2012 | Boerjes | A61B 5/4547 433/223 |
| 2013/0124151 A1* | 5/2013 | Mech | G06F 17/50 703/1 |
| 2013/0176312 A1* | 7/2013 | Schouwenburg | B29C 67/0088 345/424 |
| 2014/0043630 A1* | 2/2014 | Buser | B29C 64/106 358/1.13 |
| 2014/0288699 A1* | 9/2014 | Williams | G07F 17/26 700/233 |
| 2015/0042678 A1* | 2/2015 | Alt | G06F 3/005 345/633 |
| 2015/0205544 A1* | 7/2015 | Webb | G06F 3/126 358/1.15 |
| 2015/0269282 A1* | 9/2015 | Nelaturi | G06F 17/50 700/98 |
| 2015/0269289 A1* | 9/2015 | Kim | G06F 17/5009 703/6 |
| 2015/0269290 A1* | 9/2015 | Nelaturi | G06F 17/5009 703/6 |
| 2015/0379599 A1* | 12/2015 | Bodell | G06Q 10/06 705/26.35 |
| 2016/0051348 A1* | 2/2016 | Boerjes | A61B 5/4547 433/215 |
| 2016/0121549 A1* | 5/2016 | Jang | B29C 64/386 700/98 |
| 2016/0361878 A1* | 12/2016 | Gain | B29C 67/0088 |
| 2017/0124726 A1* | 5/2017 | Soulard | B33Y 50/02 |
| 2017/0150004 A1* | 5/2017 | Webb | G06F 3/126 |
| 2017/0186071 A1* | 6/2017 | Dodd | G06Q 30/0633 |
| 2018/0033193 A1* | 2/2018 | Goel | G06T 17/00 |

\* cited by examiner

FIG. 6

| | | | Record 1 | Record 2 | Record 3 | ... |
|---|---|---|---|---|---|---|
| Forming result information (521) | 524 | ⋮ | | | | |
| | 523 User comment | | NULL | Details are unclear | NULL | |
| | 522 Forming result image | | NULL | fig1 | NULL | |
| | Forming success or failure | | success | failure | failure | |
| Forming apparatus feature amount and forming setting value (511) | 514 | ⋮ | | | | |
| | 513 Filament diameter | | 1.75 | 1.75 | 2.85 | |
| | 512 Head temperature | | 200 | 180 | 230 | |
| | Layering pitch | | 0.03 | 0.05 | 0.05 | |
| 3D data feature amount (501) | 504 | ⋮ | | | | |
| | 503 Thinnest portion thickness | | 0.05 | 0.1 | 0.1 | |
| | 502 Slimmest portion diameter | | 0.1 | 0.1 | 0.2 | |
| | Finest cavity diameter | | 0.2 | 0.2 | 0.1 | |

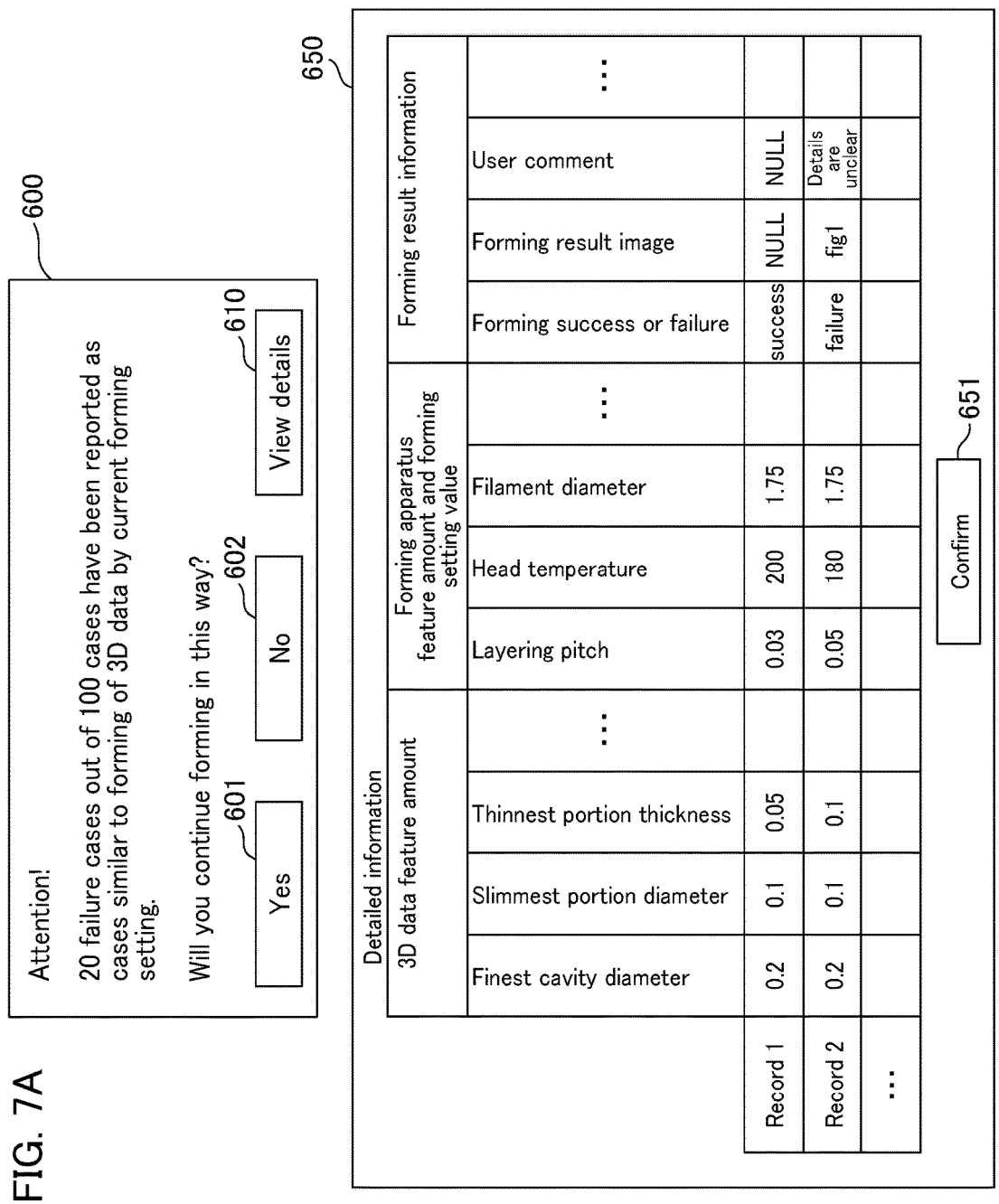

FIG. 8

How was the forming result?
Please cooperate in providing feedback for service improvement.

・Are you satisfied with the forming result?
(1. Dissatisfied    2. Neither    3. Satisfied)

・Share image of the forming result.
File name                               Refer to ・Share if you have comments on the forming result.

Transmit

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

In recent years, forming apparatuses that forms 3-dimensional objects, that is, so-called 3D printers, have been widely used. Japanese Patent Laid-Open No. 2015-229349 discloses an apparatus that detects a printing error and corrects the error during a printing operation of producing a 3D object in a printer.

However, even when correction is executed during a printing operation as in the apparatus disclosed in Japanese Patent Laid-Open No. 2015-229349, a forming result intended by a user may not be obtained depending on performance of a forming apparatus, the nature of a material, or characteristics of original data. For example, portions expressed in detail in original data are not reflected in forming results in some cases. In addition, in order to execute forming by a forming apparatus, a given time is necessary and a given amount of the material is consumed. Therefore, it is disadvantageous for users when forming results intended by the users are not obtained.

SUMMARY OF THE INVENTION

The present invention provides an information processing apparatus capable to suppress obtaining a forming result unintended by a user.

According to an aspect of the present invention, an information processing apparatus comprises: a memory storing instructions; and a processor which is capable of executing the instructions causing the information processing apparatus to: perform a check whether there is information indicating that forming is impracticable with reference to content of data for a forming apparatus to form a 3-dimensional object; perform acquisition of a feature amount and forming setting related to 3-dimensional forming of the data if it is determined that there is no information indicating that the forming is impracticable in the check; perform transmission of the acquired feature amount and forming setting to an external server that evaluates the forming; and supply information regarding forming evaluation which is based on the feature amount and the forming setting and is acquired from the external server.

Further features of the present invention will become apparent from the following description of exemplary embodiments (with reference to the attached drawings).

BRIEF DESCRIPTION OF THE DRAWINGS

FIG. 6 is a diagram illustrating examples of feature amounts of 3D data.

FIGS. 7A and 7B are diagrams illustrating an example of notification to a user.

FIG. 8 is a diagram illustrating an example of a screen on which a result of a forming job is input.

DESCRIPTION OF THE EMBODIMENTS

Hereinafter, preferred embodiments of the present invention will be described with reference to attached drawings and the like.

First Embodiment

Figure 1:
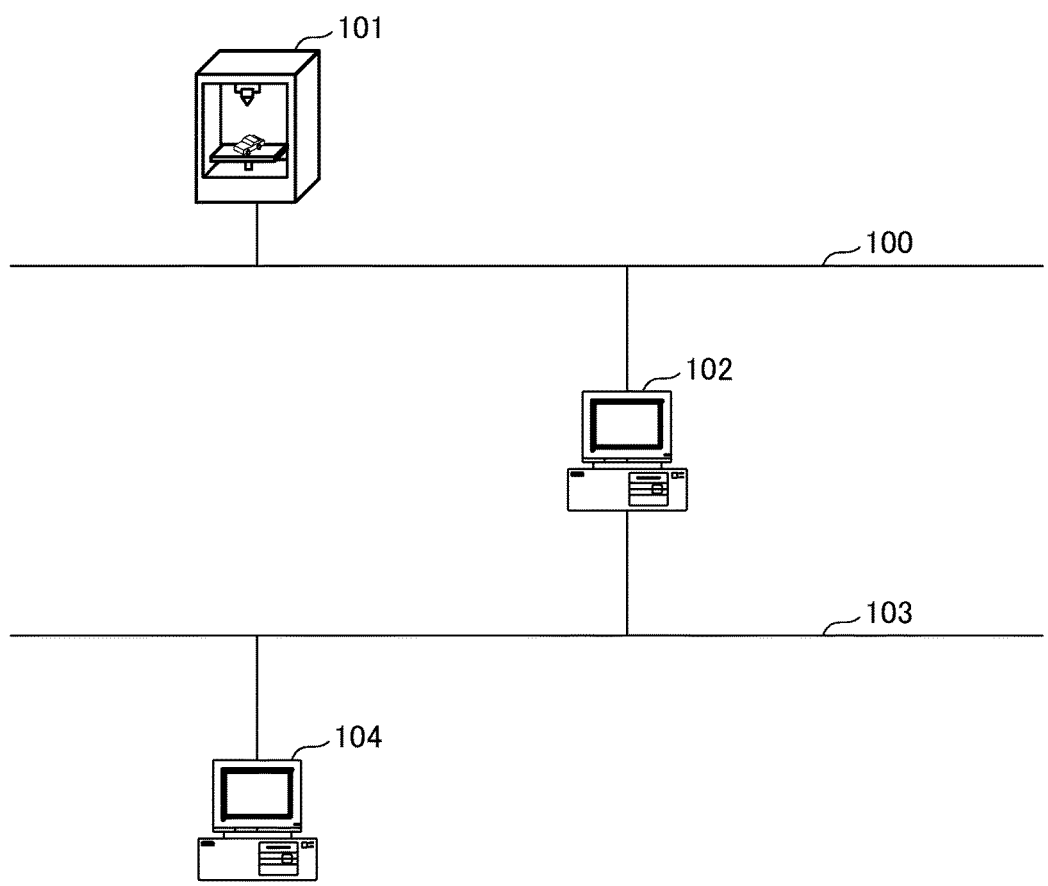
FIG. 1 is a diagram illustrating an example of a configuration of a forming system according to an embodiment.

FIG. 1 is a diagram illustrating an example of a configuration of a forming system according to an embodiment.

A forming apparatus 101 and a client terminal 102 are connected to a network 100, and the client terminal 102 and a server 104 (an external server) are connected to a network 103. The networks 100 and 103 may be the same network. An OS and an application are installed on the client terminal 102. A user transmits a forming job which is a forming instruction to the forming apparatus 101 using the application of the client terminal 102.

Figure 2A:
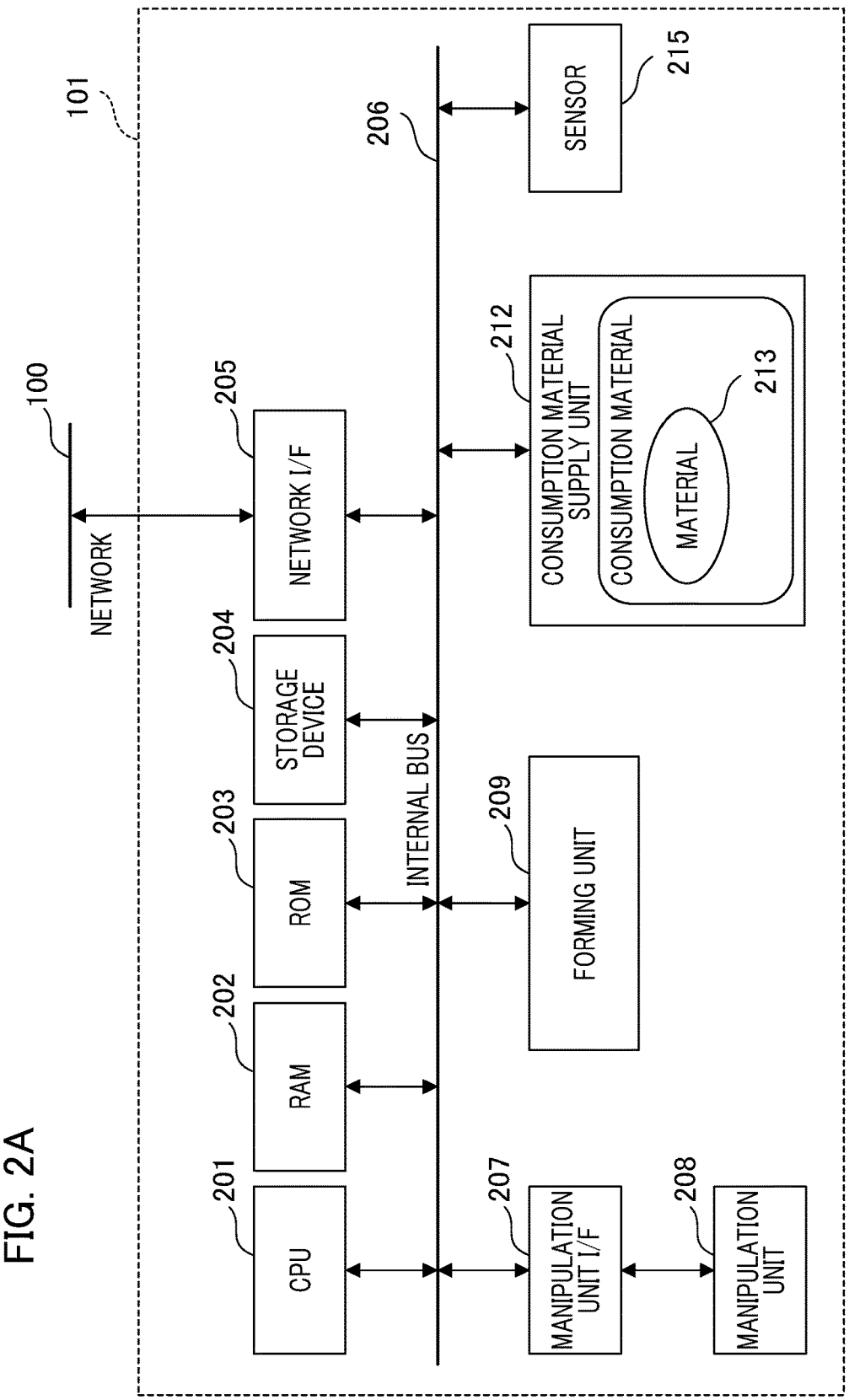
FIGS. 2A and 2B are diagrams illustrating hardware configuration examples of apparatuses included in the forming system.
Figure 2B:
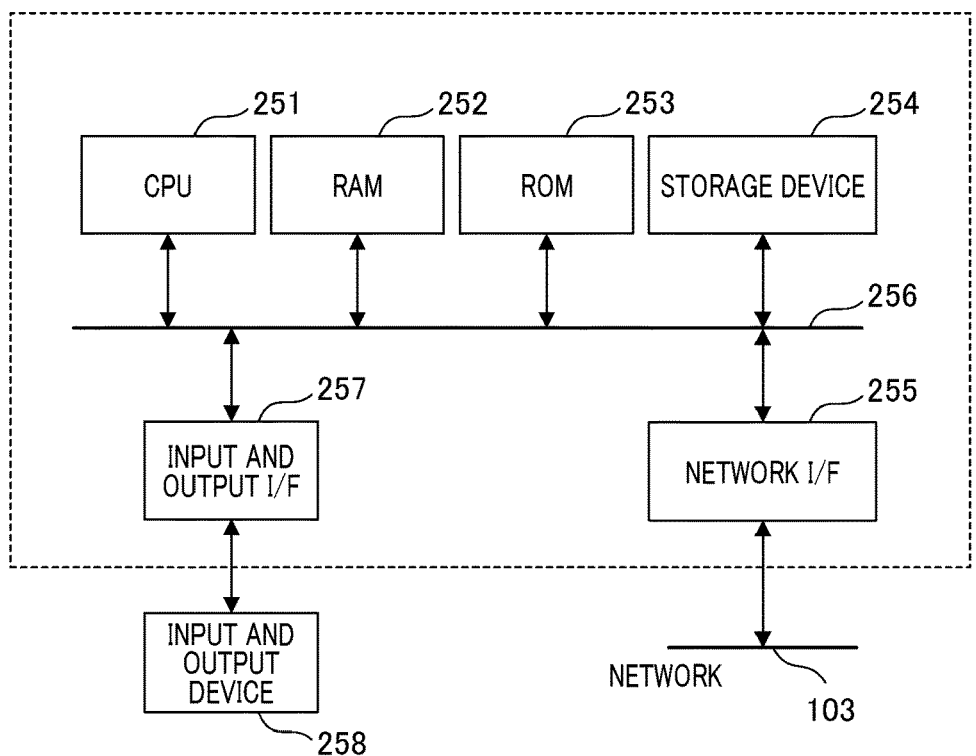

FIGS. 2A and 2B are diagrams illustrating hardware configuration examples of the apparatuses included in the forming system according to the embodiment.

FIG. 2A is a diagram illustrating a hardware configuration example of the forming apparatus 101. A CPU 201 executes a program stored in a ROM 203 or a storage device 204 and generally controls each device via an internal bus 206. The RAM 202 functions as a memory or a work area of the CPU 201. The ROM 203 records a built-in program and data. The ROM 203 also stores individual identification information or model information regarding the forming apparatus 101.

The network I/F 205 is used to exchange data unidirectionally or bidirectionally with an external network apparatus or the client terminal 102 via the network 100. The storage device 204 functions as an external storage device. Instead of the RAM 202, the storage device 204 can store forming data and can also store activation information detected and recorded in the forming apparatus 101 and information regarding a consumption material. The activation information includes fault information, status information, and log information.

A manipulation unit 208 serves to input and output data in the forming apparatus 101. Specifically, the manipulation unit 208 receives an input (a button input or the like) from the user and delivers a signal corresponding to the input to each of the above-described processing units via a manipulation unit I/F 207. The manipulation unit 208 includes a display device (a touch panel or the like) to provide necessary information to the user or receive a user manipulation.

A forming unit 209 includes a dedicated controller that includes a memory and a processor for controlling a forming process dependent on an additive manufacturing and a stage on which a material is repeatedly layered to produce a 3-dimensional object. The forming unit 209 also has equipment and a configuration dependent on the additive manufacturing for layering of a material, solidification and finishing of an object, and/or form of a support for the object.

Examples of the additive manufacturing to which the present invention can be applied include a thermal melting and stacking method known as Fused deposition modeling (FDM), Stereolithography (SLA), Selective laser sintering (SLS), and an ink jet scheme. The repeatedly layering of the material by the forming unit 209 are executed using a forming command corresponding to cross-sectional shape data of each layer (that is, slice data) generated from model data or the like by a 3D print application installed in the client terminal 102.

A consumption material supply unit 212 supplies a consumption material including a material 213 necessary to form an object to the forming unit 209. In a forming apparatus in which an additive manufacturing of forming a support unit at the time of forming of an object is adopted, the consumption material supply unit 212 holds a support member as a consumption material and supplies the support member to the forming unit 209. As the material 213, there are various materials such as photo-curable resin or a thermoplastic resin, a metal powder, and gypsum. As a photo-curable resin, for example, there is a liquid resin which is cured by radiation of ultra-violet light or the like.

The consumption material supply unit 212 can manage a supply amount for the forming unit 209 such as the material 213 or the support member. The supply amount is recorded as a log in the storage device 204. As the recorded log, a supply amount is recorded for each object (each job) of one record. In the recording of the log, a supply amount can also be recorded for a predetermined period in addition to each object.

When the forming apparatus 101 is capable of executing colored forming with a plurality of colors, the consumption material supply unit 212 can supply a material 213 of each of the plurality of colors to the forming unit 209, and thus can manage an individual supply amount for each color. Then, the supply amount can be recorded as a log in the storage device 204. Supplementation of a consumption material to the consumption material supply unit 212 is executed by mounting a bottle that contains the material 213 such as a liquid or a powder on the consumption material supply unit 212. A consumption material may be manually supplied from a dedicated bottle or the like to the consumption material supply unit 212.

A plurality of sensors 215 for different purposes are disposed in the forming apparatus 101. Main examples of the sensors disposed in the forming apparatus 101 will be described below. A certain sensor detects a supply amount of consumption material managed by the consumption material supply unit 212 to the forming unit 209 or detects a remaining amount of consumption material retained in the consumption material supply unit 212. A sensor detecting that a bottle containing the material 213 is mounted and detecting identification information regarding the bottle may be disposed in the forming apparatus 101.

A sensor detecting temperature abnormality, a failure, or the like in the forming unit 209 is disposed. When there is a forming head or a stage for a forming process in the forming unit 209, a sensor counting the number of times it is driven (a movement distance) is disposed in the forming unit 209. The examples in which the above-described sensors are disposed as hardware have been described. Some or all of the sensors may be substituted with software sensors that have equivalent detection functions.

The forming apparatus 101 includes, as an optional device, an incidental facility necessary according to an additive manufacturing or a peripheral device (not illustrated) expanding a function or a mechanism of a 3D printer such as a camera or an IC card reader. As an example of the incidental facility, there is a device necessary as powder measures in the case of an ink jet scheme or a washing device necessary in the case of photo forming (SLA).

FIG. 2B is a diagram illustrating a hardware configuration example of an information processing apparatus such as the client terminal 102 and the server 104.

A CPU 251 executes a program stored in a ROM 253 or a storage device 254 and controls the entire information processing apparatus via an internal bus 256. The ROM 253 or the storage device 254 stores various kinds of data in addition to the program. For example, the storage device 254 stores device information or activation information of the forming apparatus 101. The RAM 252 functions as a memory or a work area of the CPU 201.

An input and output I/F 257 is, for example, PS2, a Universal Serial Bus (USB), or an analog or digital display I/F. The input and output device 258 is a keyboard, a mouse, a CRT, or a liquid crystal display. The input and output device 258 can be connected to the information processing apparatus via the input and output I/F 257. In the information processing apparatus, a network I/F 255 executes communication via the network 103.

The ROM 253 stores an initial program that activates the information processing apparatus or a basic program for controlling each module of the information processing apparatus. The storage device 254 stores an OS or an application. When power is supplied to the information processing apparatus, a program (a boot loader) that activates the computer and is stored in the ROM 253 is first executed. The program loads the OS stored in the storage device 254 to the RAM 252 and delivers a control right to the OS.

The OS reads a necessary module or driver software from the storage device 254 to the RAM 252. The OS reads a necessary application from the storage device 254 to the RAM 252 to execute the application in response to an instruction from the user. In the embodiment, the CPU 251 loads a program stored in the storage device 254 of the information processing apparatus to the RAM 252 and executes the program to realize each process to be described below.

Figure 3:
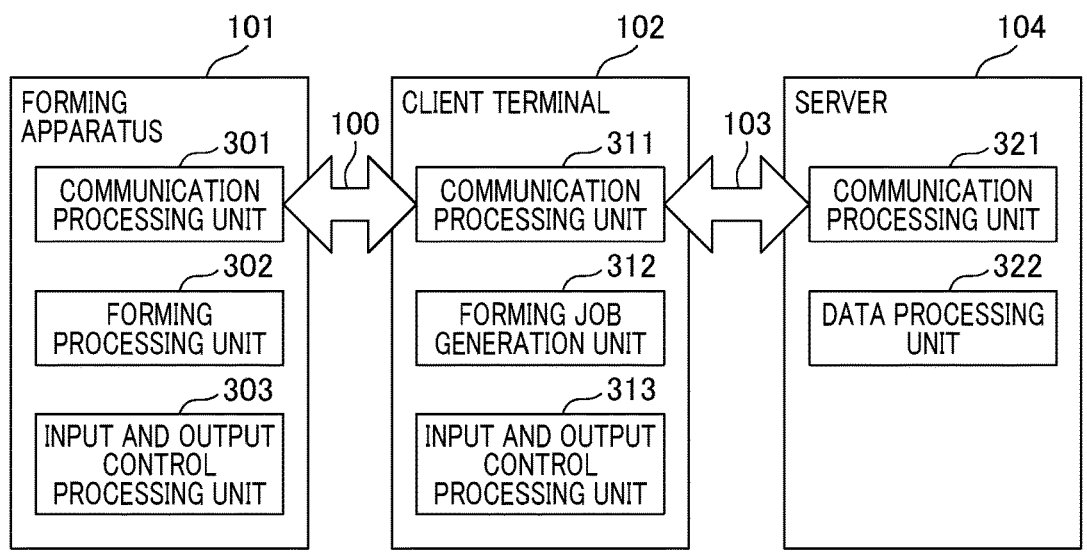
FIG. 3 is a diagram illustrating a software configuration example of each apparatus included in the forming system.

FIG. 3 is a diagram illustrating a software configuration example of the forming system according to the embodiment.

The forming apparatus 101 includes a communication processing unit 301, a forming processing unit 302, and an input and output control processing unit 303. The communication processing unit 301 communicates with another apparatus via the network 100. The forming processing unit 302 executes a forming job in the forming apparatus 101 and outputs an object. The input and output control processing unit 303 controls input and output information from the manipulation unit 208.

The client terminal 102 includes a communication processing unit 311, a forming job generation unit 312, and an input and output control processing unit 313. The communication processing unit 311 communicates with another apparatus via the network 100 or 103. The forming job generation unit 312 generates a forming instruction which can be interpreted by the forming apparatus 101 as a forming job. The input and output control processing unit 313 controls input and output information from the input and output device 258. Driver software or an OS executing a process of each flowchart to be described below is a main constituent of the control and realizes each function of the above-described software.

The server 104 includes a communication processing unit 321 and a data processing unit 322. The communication processing unit 321 communicates with another apparatus via the network 103. The data processing unit 322 manages data regarding a forming job. The data regarding the forming job managed by the data processing unit 322 can include information regarding forming evaluation. That is, the server 104 can function as a server that evaluates forming.

The forming system is formed in such a manner that the forming apparatus 101, the client terminal 102, and the server 104 communicate via the communication processing units 301, 311, and 321.

Figure 4:
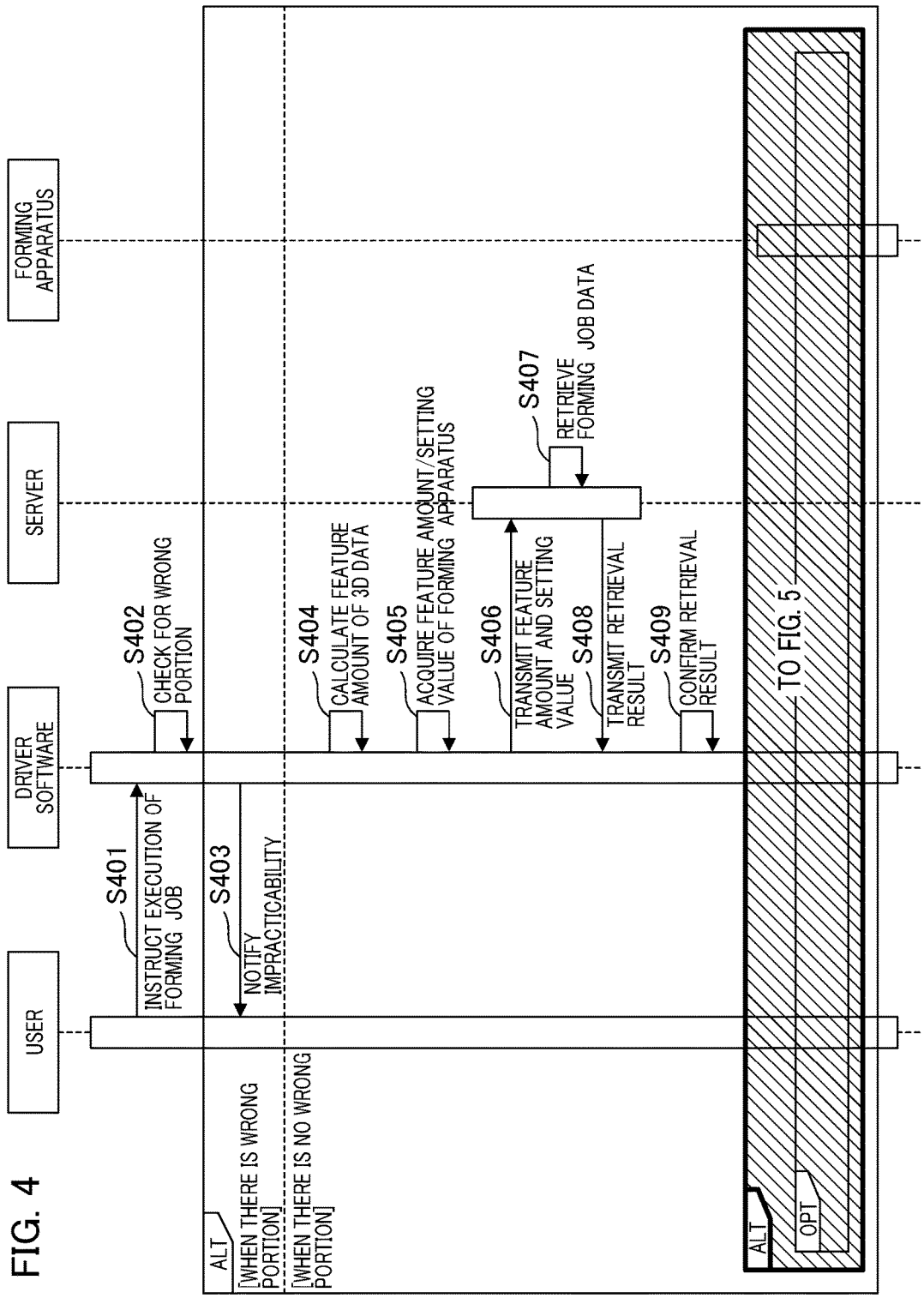
FIG. 4 is a flowchart illustrating a flow of processes according to a first embodiment.
Figure 5:
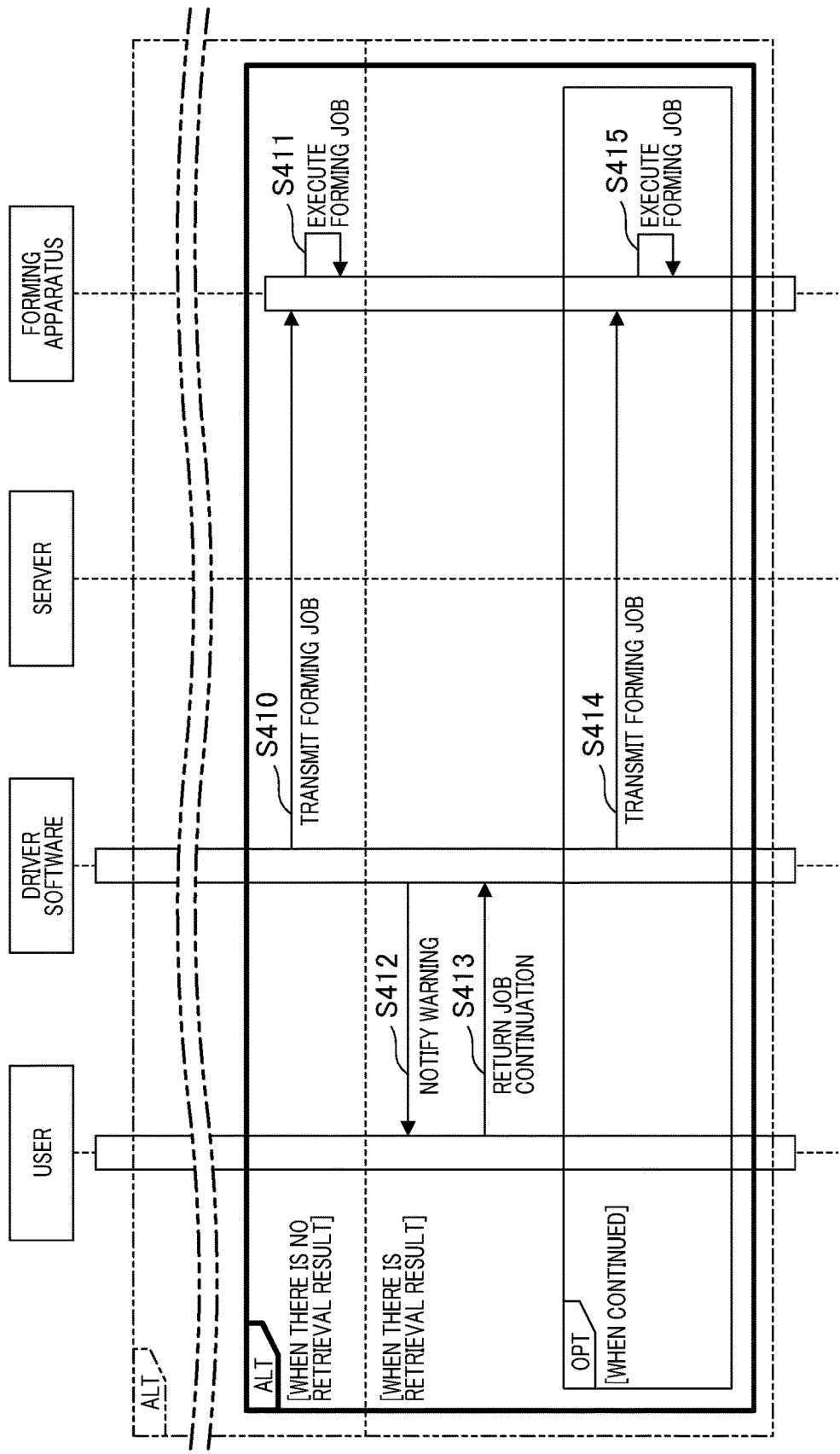
FIG. 5 is a flowchart illustrating the flow of the processes according to the first embodiment.

FIGS. 4 and 5 are flowcharts illustrating a flow of processes according to a first embodiment.

In step S401, driver software for the forming apparatus 101 operating on the client terminal 102 receives an instruction to execute a forming job from the user. The execution instruction may be an instruction given via the driver software or may be an instruction given via a function of the OS.

In step S402, the driver software interprets 3D data of a forming target and confirms whether there is a wrong portion in the 3D data. Here, when forming is executed, it is confirmed that there is no deficit or defect in the structure of the 3D data. That is, the driver software checks whether there is information indicating that forming is impracticable with reference to content of the 3D data.

When the driver software determines in step S402 that there is a wrong portion, the driver software notifies the user that the forming job is impracticable in step S403. Conversely, when the driver software determines in step S402 that there is no wrong portion, the driver software interprets the 3D data of the forming target and calculates a feature amount of the 3D data in step S404.

FIG. 6 is a diagram illustrating one feature amount of the 3D data. In the embodiment, numerical values indicating a "finest cavity diameter" 502, a "slimmest portion diameter" 503, and a "thinnest portion thickness" 504 are treated as "3D data feature amount" 501. However, when the feature amount can be calculated from the 3D data and is a feature amount that has an influence on a forming result, a feature amount other than the feature amount illustrated in FIG. 6 may be the 3D data feature amount 501. The 3D data feature amount 501 may not necessarily include all of the information 502 to 504 illustrated in FIG. 6 and may include at least one piece of the information 502 to 504.

Description will now return to FIG. 4. In step S405, the driver software acquires a feature amount and a forming setting value of the forming apparatus 101. FIG. 6 illustrates an example of the feature amount and the forming setting value of the forming apparatus. In the embodiment, numerical values indicating a "layering pitch" 512, a "head temperature" 513, and a "filament diameter" 514 are treated as "a forming apparatus feature amount and forming setting value" 511. However, when the feature amount and the forming setting value are a feature amount and a forming setting value of the forming apparatus and are a feature amount and a forming setting value that have an influence on a forming result, a feature amount and a forming setting value other than the feature amount and the forming setting value described in FIG. 6 may be the forming apparatus feature amount and forming setting value 511.

It is not necessary to include all of the information 512 to 514 illustrated in FIG. 6, but at least one piece of the information may be included. The feature amount and forming setting value 511 may be feature amounts unique to the forming apparatus. Further, in FIG. 4, the process of step S405 has been described as a process in driver software. However, a feature amount or a setting value of the forming apparatus may be acquired by communicating with the forming apparatus 101 as necessary.

In step S406, the driver software transmits the feature amount of the 3D data calculated in step S404 and the feature amount and the forming setting value of the forming apparatus 101 acquired in step S405 to the server 104. In step S407, the server 104 receives the feature amount of the 3D data transmitted from the driver software in step S406 and the feature amount and the forming setting value of the forming apparatus. Then, the server 104 retrieves a record 531 identical or similar to the received information among forming job data 500 managed by the data processing unit 322.

A structure in which a threshold or an upper limit of the number of retrievals at the time of retrieving the identical or similar record is set in advance may be used. The threshold or the upper limit of the number of retrievals at the time of retrieving the identical or similar record may be received from the driver software on the client terminal 102 in conjunction with the feature amount of the 3D data and the feature amount and the forming setting value of the forming apparatus. A structure in which similarity is calculated by weighting the feature amount of the 3D data and the feature amount and the forming setting value of the forming apparatus at the time of retrieving a similar record may be used.

In step S408, the server 104 transmits forming result information 521 of the record 531 identical or similar to the received information as a retrieval result to the driver software on the client terminal 102. FIG. 6 illustrates an example of the forming result information 521. In the embodiment, values indicating "forming success or failure" 522, a "forming result image" 523, and a "user comment" 524 regarding a forming result are treated as the "forming result information" 521.

However, when the information is information regarding the forming result and information which can be referred to by a user executing forming in the future, information other than the information illustrated in FIG. 6 may be the forming result information 521. It is not necessary to include all of the information 521 to 524 illustrated in FIG. 6, but at least one piece of the information may be included.

In step S409, the driver software receives the retrieval result transmitted from the server 104 in step S408 and determines whether information identical or similar to the information transmitted in step S406 is included in the received retrieval result. When it is determined in step S409 that the identical or similar information is not included in the retrieval result, the process proceeds to step S410 of FIG. 5.

In step S410, the driver software transmits a forming job to the forming apparatus 101. When the forming job is transmitted, the forming job generation unit 312 generates a forming instruction which can be interpreted by the forming apparatus 101 when the 3D data of the forming target is formed. In step S411, the forming apparatus 101 executes the forming job transmitted from the driver software on the client terminal 102 in step S410.

Conversely, when it is determined in step S409 that the identical or similar information is included in the retrieval result, the process proceeds to step S412 of FIG. 5. In step S412, the driver software notifies the user based on the retrieval result.

FIGS. 7A and 7B are diagrams illustrating an example of the notification.

FIG. 7A illustrates an example of a notification dialog. A notification dialog 600 notifies the user of a forming failure ratio of a forming job identical or similar to the forming job and confirms that the user will continue the forming job. When the user will continue the forming job, the user selects a "YES" button 601. When the user will not continue the forming job, the user selects a "NO" button 602.

When the user selects a "detail display" button 610, the driver software displays a detailed information dialog 650 illustrated in FIG. 7B. In the detailed information dialog, a feature amount of 3D data of a job identical or similar to a forming job to be executed and a feature amount and a forming setting value of the forming apparatus having executed the job are displayed and forming result information of each record is displayed. When the user selects the "confirm" button 651, the detailed information dialog 650 is closed.

Description will now return to FIG. 5. In step S413, the user returns whether the user will continue the forming job. When the user will continue the forming job, steps S414 and S415 are executed. The processes of steps S414 and S415 are the same as the processes of steps S410 and S411. In the embodiment, a method of constructing forming job data 500 managed by the data processing unit 322 of the server 104 is not particularly limited.

For example, the forming job data 500 may be constructed by collecting results obtained in advance from many forming jobs under different conditions. The forming job data 500 may be statically fixed data or dynamically updated data. For example, a structure in which the driver software on the client terminal 102 automatically transmits a result of a job to the server 104 after forming, that is, at the time of completion of a forming job, may be used. The driver software on the client terminal 102 may display an input dialog 700 illustrated in FIG. 8 and prompt the user to input a result of the forming job.

The user can register satisfaction or dissatisfaction with the result obtained by executing the forming job and an image or a comment of the forming result in the server 104. When the user selects a "Transmit" button 710, information input in the input dialog 700 is associated with the detailed information (for example, the information illustrated in FIGS. 6 and 7) regarding the executed job to be registered in the server 104. A structure in which the forming job data 500 is sequentially updated by acquiring the result of the forming job in the structure and transmitting the result to the server 104 may be used.

As described above, according to the embodiment, the information regarding evaluation when the forming will be executed can be suggested to the user before a forming instruction is given to the forming apparatus. Accordingly, it is possible to prevent a forming result unintended by the user from being obtained.

Second Embodiment

In the first embodiment, the method of preventing a forming result unintended by a user from being obtained beforehand by causing the driver software on the client terminal 102 to notify the user based on a retrieval result in step S412 has been described. In an embodiment, on the other hand, a method of executing a correction process so that a forming result intended by a user can be obtained by preventing a possibility of a forming result unintended by a user being obtained when there is such possibility will be described. Hereinafter, the same reference numerals are given to the same constituents as those of the first embodiment and only differences from the first embodiment will be described.

Figure 9:
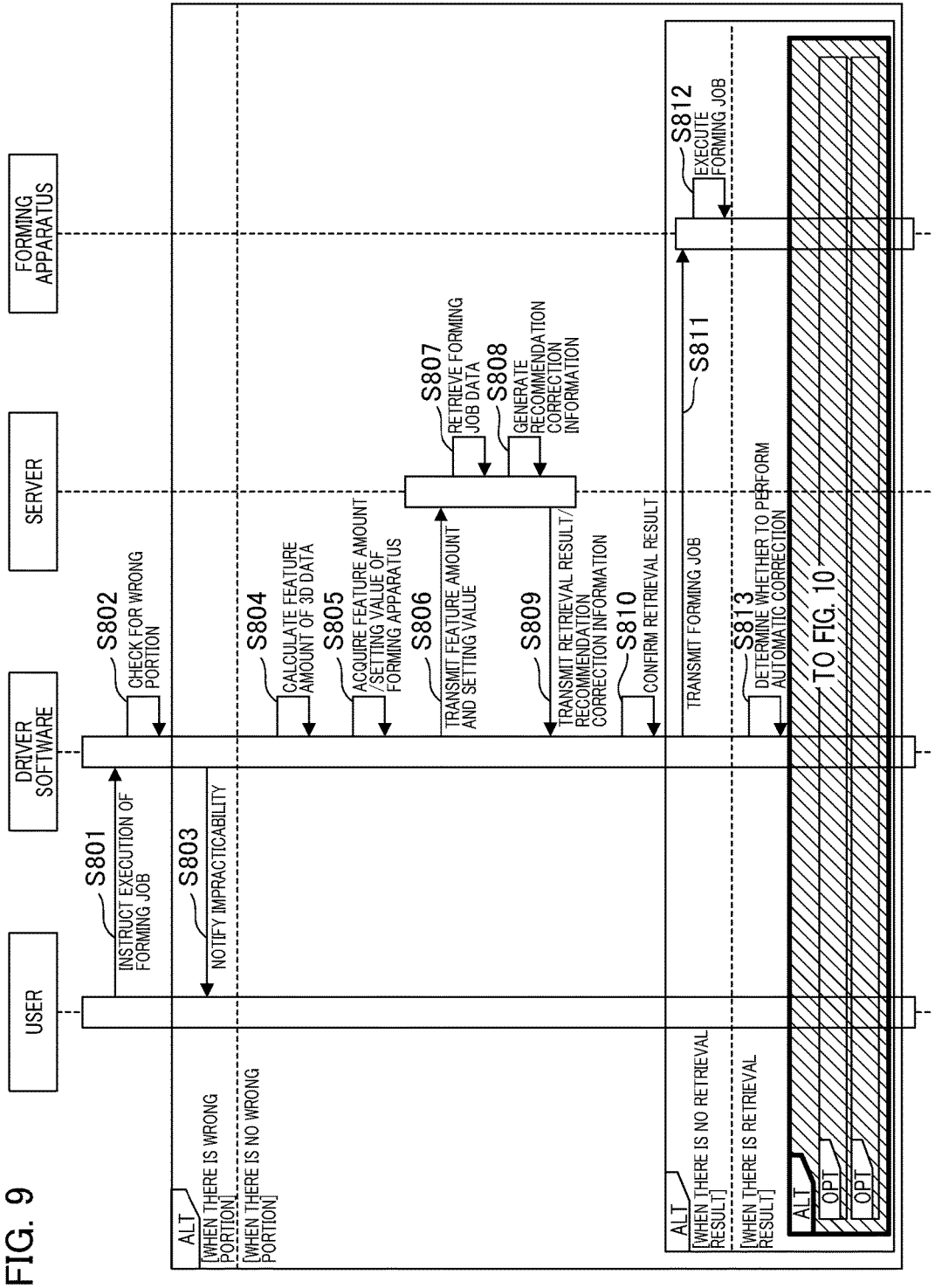
FIG. 9 is a flowchart illustrating a flow of processes according to a second embodiment.
Figure 10:
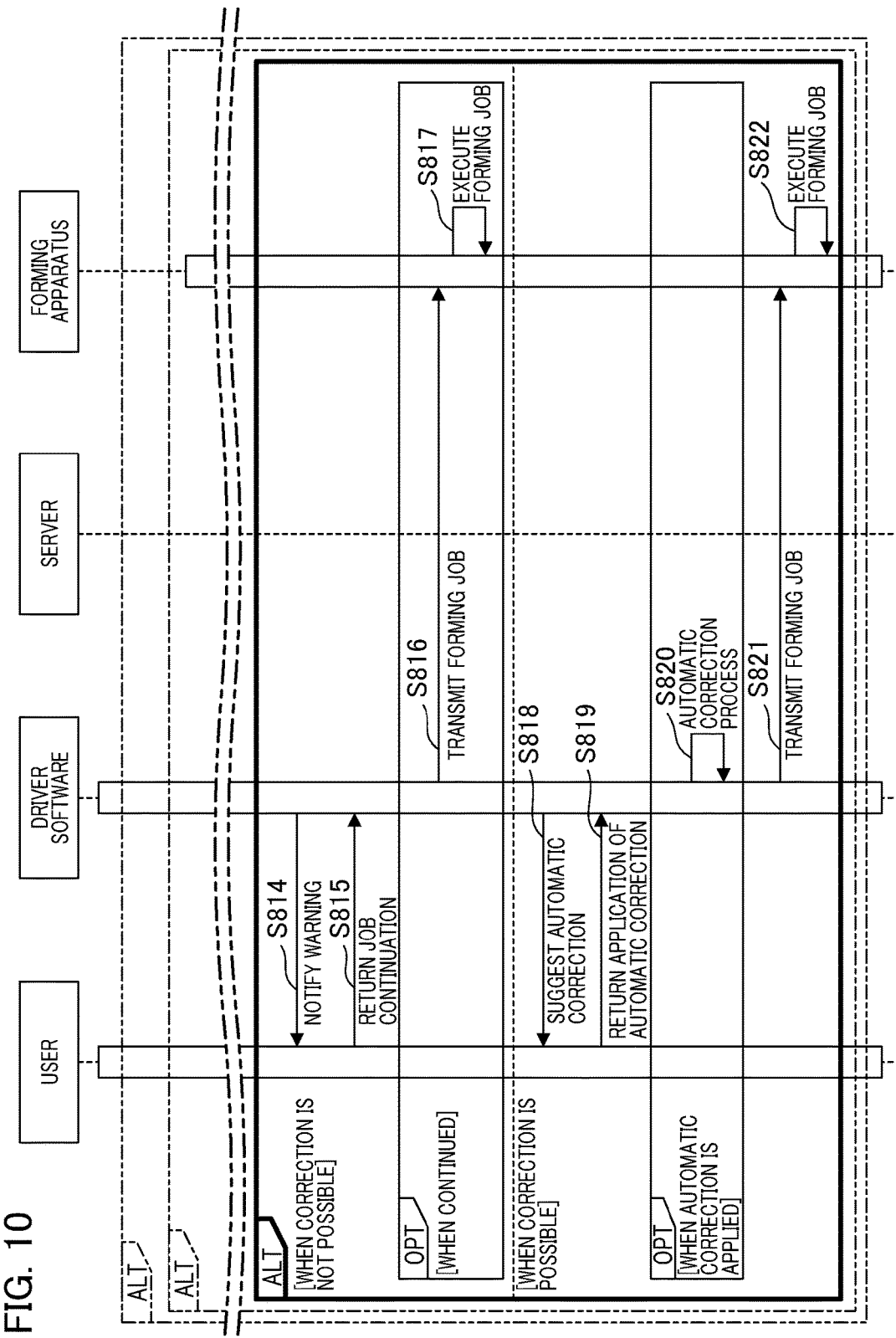
FIG. 10 is a flowchart illustrating the flow of the processes according to the second embodiment.

FIGS. 9 and 10 are flowcharts illustrating a flow of processes according to the embodiment.

Since the processes of steps S801 to S807 are the same as the processes of steps S401 to S407 in the first embodiment, the description thereof will be omitted. In step S808, the server 104 analyzes the record 531 retrieved in step S807 as a target and generates recommendation correction information.

Specifically, the server 104 specifies a record for which a success ratio of the forming success or failure 522 increases by changing the 3D data feature amount 501 or the forming apparatus feature amount and forming setting value 511 of one of the records 531 retrieved through the analysis. The number of records specified by the analysis, that is, the number of 3D data feature amounts 501 and the number of forming apparatus feature amounts and forming setting values 511, may be plural. The recommendation correction information is information configured of the 3D data feature amount 501 specified by the analysis or the forming apparatus feature amount and forming setting value 511 and values obtained when the 3D data feature amount 501 or the forming apparatus feature amount and forming setting value 511 are corrected, that is, changed content.

In step S809, the server 104 transmits the forming result information 521 of the record 531 identical or similar to the received information and the recommendation correction information generated in step S808 as the retrieval result to the driver software on the client terminal 102. In step S810, the driver software receives the retrieval result transmitted from the server 104 in step S809 and determines whether the information identical or similar to the information transmitted in step S806 is included in the received retrieval result.

When it is determined in step S810 that the identical or similar information is not included in the retrieval result, the process proceeds to step S811. Since the processes of steps S811 and S812 are the same as the processes of steps S410 and S411 illustrated in FIG. 6, the description thereof will be omitted.

Conversely, when it is determined in step S810 that the identical or similar information is included in the retrieval result, the process proceeds to step S813. In step S813, the driver software determines whether the received recommendation correction information is content which can be corrected through a function of the driver software. A determination standard of whether the received recommendation correction information is the content which can be corrected through the function of the driver software is based on whether the 3D data feature amount 501 or the forming apparatus feature amount and forming setting value 511 which is a forming target and is included in the recommendation correction information is a component which can be controlled by the driver software.

The determination standard of whether the received recommendation correction information is the content which can be corrected through the function of the driver software is based on whether change is possible with values included in the recommendation correction information. For example, when the values corrected by the recommendation correction information are values of the forming apparatus feature amount and forming setting value 511, are not unique to the forming apparatus 101, and are included in a range in which a value of the recommendation correction information can be set, it can be determined that the 3D data feature amount 501 or the forming apparatus feature amount and forming setting value 511 is a component which can be controlled by the driver software. When the value corrected with the recommendation correction information is the value of the 3D data feature amount 501 and can be automatically edited and corrected through the function of the driver software, it can be determined that the 3D data feature amount 501 or the forming apparatus feature amount and forming setting value 511 is a component which can be controlled by the driver software.

When it is determined in step S813 that the received recommendation correction information is not the content which can be corrected through the function of the driver software, the driver software allows the process to proceed to step S814 of FIG. 10. In step S814, the driver software notifies the user based on the retrieval result. The subsequent processes, that is, the processes of steps S815 to S817, are the same as the processes of steps S413 to S415 illustrated in FIG. 5 in the first embodiment.

Conversely, when it is determined in step S813 that the received recommendation correction information is the content which can be corrected through the function of the driver software, the process proceeds to step S818 of FIG. 10. In step S818, the driver software notifies the user of the retrieval result and offers a suggestion based on the recommendation correction information.

Figure 11:
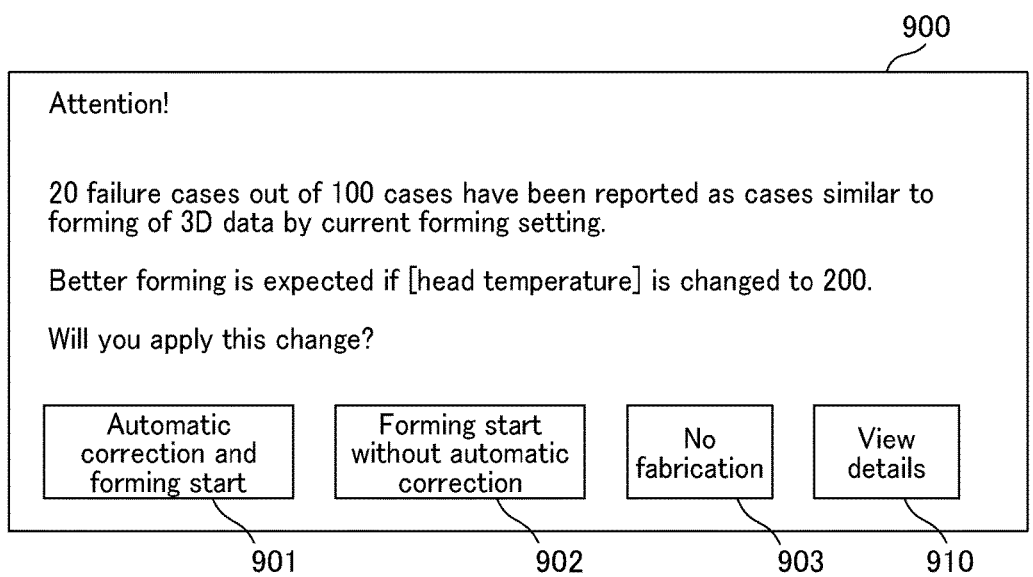
FIG. 11 is a diagram illustrating an example of notification and suggestion to a user.

FIG. 11 illustrates an example of the notification and the suggestion.

A notification dialog 900 notifies the user of a forming failure ratio of the forming job identical or similar to the forming job and offers the user a suggestion for increasing a forming success ratio based on the recommendation correction information. Then, it is confirmed that the user will continue the forming job. The notification dialog 900 is merely an example and the invention is not limited thereto. For example, only a suggestion for a correction process based on the recommendation correction information may be offered without notifying of the forming failure ratio.

The user selects an "automatic correction and forming start" button 901 when the user executes a forming jot after application of the correction process based on the recommendation correction information suggested by the notification dialog 900. The user selects a "forming start without automatic correction" button 902 when the user executes the forming job without applying the correction process based on the recommendation correction information suggested by the notification dialog 900. The user selects a "no forming" button 903 when the user will not continue the forming job. When the user selects a "detailed display link" button 910, the driver software displays the detailed information dialog 650 illustrated in FIG. 7B.

The description will now return to FIG. 9. In step S819, the user returns whether the correction process is applied. When the correction process is applied, the process proceeds to step S820. Conversely, when the correction process is not applied, the process proceeds to step S821. In step S820, the driver software executes the correction process of changing the 3D data feature amount 501 or the forming apparatus feature amount and forming setting value 511 which is a target of the correction process based on the recommendation correction information into a value of the recommendation correction information.

For example, when the value corrected with the recommendation correction information is the value of the forming apparatus feature amount and forming setting value 511, is not unique to the forming apparatus 101, and is included in a range in which the value of the recommendation correction information can be set, the value of the correction target is changed into the value of the recommendation correction information. When the value corrected with the recommendation correction information is the value of the 3D data feature amount 501, the driver software changes the value of the correction target into the value of the recommendation correction information by editing and correcting the 3D data of the forming job. The processes of steps S821 and S822 are the same as the processes of steps S811 and S812.

As described above, according to the embodiment, the same advantages as those of the first embodiment are obtained. Further, according to the embodiment, when there is a possibility of a forming result unintended by the user being obtained, the correction process of preventing the possibility and obtaining a forming result intended by the user can be automatically executed.

Third Embodiment

In the first embodiment, the series of processes illustrated in FIG. 4 is executed by the driver software on the client terminal 102. However, in an embodiment, a case in which the OS on the client terminal 102 executes the series of processes instead of the driver software will be described. Hereinafter, the same reference numerals are given to the same constituents as those of the first embodiment and only differences from the first embodiment will be described.

Figure 12:
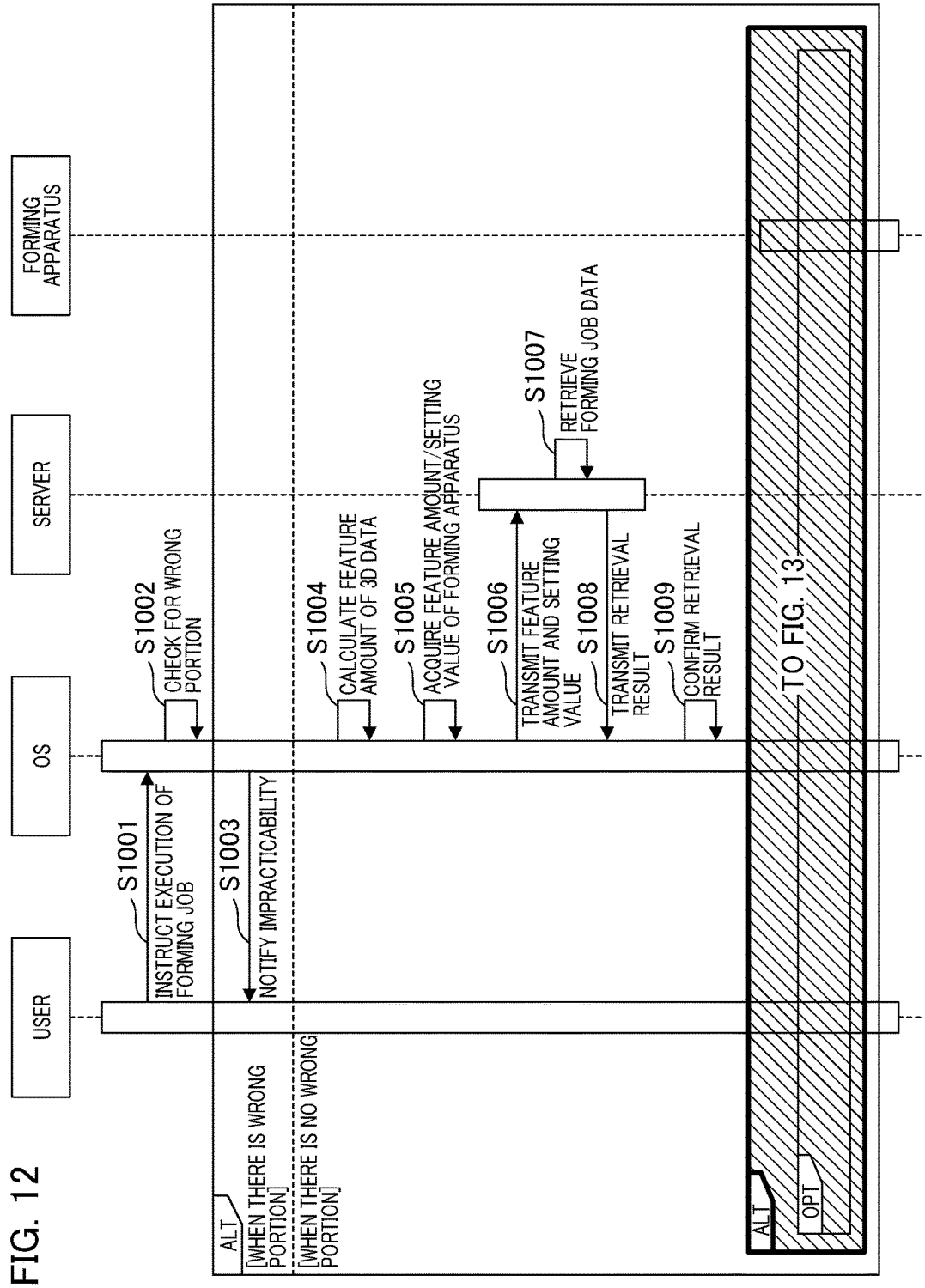
FIG. 12 is a flowchart illustrating a flow of processes according to a third embodiment.
Figure 13:
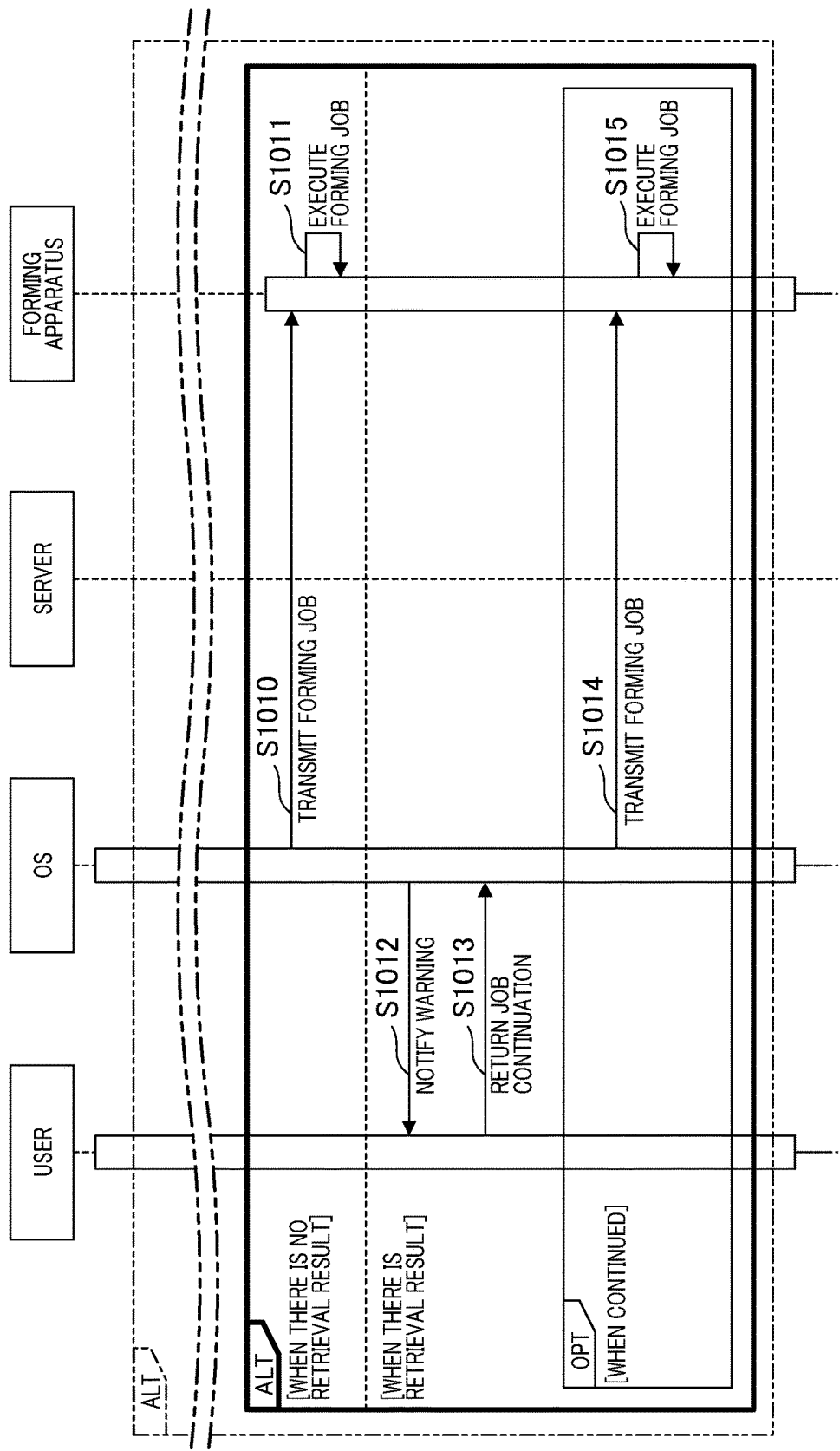
FIG. 13 is a flowchart illustrating the flow of the processes according to the third embodiment.

FIGS. 12 and 13 are flowcharts illustrating a flow of processes according to the embodiment.

In step S1001, the OS on the client terminal 102 receives an instruction to execute a forming job via a function of the OS from the user. When the instruction to execute the forming job is received via the function of the OS, it is necessary to register the forming apparatus 101 as a forming apparatus capable of giving a forming instruction in the OS beforehand.

A unit registering a forming apparatus in the OS is installed, for example, as driver software corresponding to the forming apparatus 101. The unit may be automatically installed as driver software by connecting the forming apparatus 101 to the client terminal 102 via a network or a USB. At this time, the unit may be automatically installed by referring to information of a hardware ID or a compatible ID indicating unique information of the forming apparatus 101.

In step S1002, the OS on the client terminal 102 interprets 3D data of a forming target and confirms whether there is no wrong portion in the 3D data. There are diverse formats of the 3D data. A structure in which a conversion process is executed beforehand on a specific format in which it is easy to confirm a wrong portion among formats which can be interpreted by the OS may be used. For example, a format expressed with indexed coordinates described in the XML form may be used.

A format including description of information regarding a raw material at the time of forming, an auxiliary material at the time of forming, and an internal filling structure may be used. A structure in which a filtering process for a beforehand conversion process is provided as a conversion API by the OS may be used.

When the OS determines in step S1002 that there is a wrong portion, the OS notifies the user that the forming job is impracticable in step S1003. Conversely, when the OS determines in step S1002 that there is no wrong portion, the OS interprets the 3D data of the forming target and calculates a feature amount of the 3D data in step S1004. The feature amount calculated herein may include not only the feature amount illustrated in FIG. 6 but also a feature amount specified in the format of the D3 data described above.

In step S1005, the OS acquires the feature amount and the forming setting value of the forming apparatus 101. The feature amount and the forming setting value of the forming apparatus may be acquired by communicating with the forming apparatus 101 using a web service of an OS standard as necessary. In step S1006, the OS transmits the feature amount of the 3D data calculated in step S1004 and the feature amount and the forming setting value of the forming apparatus acquired in step S1005 to the server 104.

The server 104 may be a specific server associated with the OS on the client terminal 102. In this case, a structure in which the series of processes of communicating with the specific server is provided as a communication API may be used. In step S1007, the server 104 receives the feature amount of the 3D data transmitted from the OS on the client terminal 102 in step S1006 and the feature amount and the forming setting value of the forming apparatus.

Then, the server 104 retrieves a record 531 identical or similar to the received information among forming job data 500 managed by the data processing unit 322. An initial value of the forming job data 500 stored by the server 104 may be a value based on a plurality of forming results of a forming job provided in advance from each forming device vendor by an OS vendor.

A forming job provided from each forming vendor may be a forming job when the OS vendor supplies sample data to each forming device vendor and each forming vendor executes a forming process using the sample data. In step S1008, the server 104 transmits forming result information 521 of the record 531 identical or similar to the received information as a retrieval result to the OS on the client terminal 102.

In step S1009, the OS on the client terminal 102 receives the retrieval result transmitted from the server 104 in step S1008 and determines whether information identical or similar to the information transmitted in step S1006 is included in the received retrieval result. When it is determined in step S1009 that the identical or similar information is not included in the retrieval result, the process proceeds to step S1010 of FIG. 13.

In step S1010, the OS transmits a forming job to the forming apparatus 101. In step S1011, the forming apparatus 101 executes the forming job transmitted from the OS on the client terminal 102 in step S1010. Conversely, when it is determined in step S1009 that the identical or similar information is included in the retrieval result, the process proceeds to step S1012 of FIG. 13. In step S1012, the OS on the client terminal 102 notifies the user based on the retrieval result.

In step S1013, the user confirms whether the forming job will continue on the notification dialog (see FIG. 7A) and returns whether the forming job will continue. When the forming job will continue, steps S1014 and S1015 are executed. The processes of steps S1014 and S1015 are the same as those of steps S1010 and S1011.

The forming job data 500 according to the embodiment may be dynamically updated. As a structure for the dynamic updating, for example, a structure in which the OS on the client terminal 102 executes popup display to attract the attention of the user as in the input dialog 700 illustrated in FIG. 8 after the forming job ends may be used.

As described above, according to the embodiment, the same advantages as those of the first embodiment are obtained. Further, in the embodiment, instead of the driver software of the forming apparatus, the OS of the client terminal can execute a process related to suggestion of information regarding evaluation when the forming is executed.

In the above-described embodiments, the server 104 is configured to have the forming job data 500. However, the client terminal 102 may have the forming job data 500 or information equivalent to the forming job data 500. The feature amount and forming setting value 511 of the forming apparatus 101 in the forming job data 500 may include identification information such as a model number indicating the type of forming apparatus 101. The forming result information 521 in the forming job data 500 may include 3D data acquired setting a forming result obtained by a reading apparatus such as a 3D scanner as a target.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-169993, filed Aug. 31, 2016, which is hereby incorporated by reference wherein in its entirety.

What is claimed is:

1. An information processing apparatus comprising:
a memory storing instructions; and
a processor which is capable of executing the instructions causing the information processing apparatus to:

perform a check whether there is information indicating that forming is impracticable with reference to content of data to form a 3-dimensional object;

perform acquisition of a feature amount and forming setting related to 3-dimensional forming of the data;

perform, before a forming apparatus starts to form the 3-dimensional object by using the data, transmission of the acquired feature amount and forming setting to an external server that evaluates the forming; and supply information regarding forming evaluation which is based on the feature amount and the forming setting and is acquired from the external server, wherein the forming evaluation from the external server includes an image of a forming result and a user comment related to the forming result, wherein the image of the forming result is an image indicating a result of forming which is similar to the 3-dimensional object and is previously obtained by using the feature amount and the forming setting, and wherein in a case it is determined that there is no information indicating that the forming is impracticable in the check, the transmission to the external server is performed.

2. The information processing apparatus according to claim 1, wherein the forming setting includes identification information of the forming apparatus.

3. The information processing apparatus according to claim 1, wherein the forming setting includes at least one of a layering pitch, a head temperature, or a filament diameter of the forming apparatus.

4. The information processing apparatus according to claim 1, wherein the feature amount includes at least one of a finest cavity diameter, a slimmest portion diameter, or a thinnest portion thickness of the data.

5. The information processing apparatus according to claim 1, wherein the acquisition and the transmission are provided as functions of an OS of the information processing apparatus.

6. The information processing apparatus according to claim 1, wherein the information regarding the forming evaluation is displayed by a display unit of the information processing apparatus.

7. The information processing apparatus according to claim 1, wherein the information regarding the forming evaluation includes a ratio of forming failure based on data retrieved by the external server.

8. The information processing apparatus according to claim 1, wherein the information regarding the forming evaluation includes content of a change if a ratio of forming success increases upon changing at least one of the feature amount or the forming setting of the data.

9. The information processing apparatus according to claim 1, wherein the instructions further cause the information processing apparatus to transmit forming evaluation from a user after the object is formed to the external server.

10. A method for controlling an information processing apparatus, the method comprising:

checking whether there is information indicating that forming is impracticable with reference to content of data to form a 3-dimensional object;

acquiring a feature amount and forming setting related to 3-dimensional forming of the data;

before a forming apparatus starts to form the 3-dimensional object by using the data, transmitting the acquired feature amount and forming setting to an external server that evaluates the forming; and supplying information regarding forming evaluation which is based on the feature amount and the forming setting and is acquired from the external server, wherein the forming evaluation from the external server includes an image of a forming result and a user comment related to the forming result, wherein the image of the forming result is an image indicating a result of forming which is similar to the 3-dimensional object and is previously obtained by using the feature amount and the forming setting, and wherein in a case it is determined that there is no information indicating that the forming is impracticable in the check, the transmission to the external server is performed.

11. A non-transitory storage medium on which is stored a computer program for making a computer execute a method for controlling an information processing apparatus, the method comprising:

checking whether there is information indicating that forming is impracticable with reference to content of data to form a 3-dimensional object;

acquiring a feature amount and forming setting related to 3-dimensional forming of the data;

before a forming apparatus starts to form the 3-dimensional object by using the data, transmitting the acquired feature amount and forming setting to an external server that evaluates the forming; and supplying information regarding forming evaluation which is based on the feature amount and the forming setting and is acquired from the external server, wherein the forming evaluation from the external server includes an image of a forming result and a user comment related to the forming result, wherein the image of the forming result is an image indicating a result of forming which is similar to the 3-dimensional object and is previously obtained by using the feature amount and the forming setting, and wherein in a case it is determined that there is no information indicating that the forming is impracticable in the check, the transmission to the external server is performed.

* * * * *